Patented Feb. 17, 1948

2,436,048

UNITED STATES PATENT OFFICE 2,436,048

COMPOSITION OF TERPINENE-MALEIC ANHYDRIDE, HYDROGENATED COUMARONE-INDENE RESIN, AND POLYSTYRENE

Irving C. Matthews and William F. Lynch, Rochester, N. Y., assignors to Eastman Kodak Company, Rochester, N. Y., a corporation of New Jersey No Drawing. Original application January 24, 1940, Serial No. 315,400, now Patent No. 2,328,566, dated September 7, 1943. Divided and this application January 7, 1943, Serial No. 471,584. In Canada August 15, 1938

1 Claim. (Cl. 260—45.5)

This is a division of our pending application Serial No. 315,400, filed January 24, 1940, now Patent No. 2,328,566 issued Sept. 7, 1943, for a Composition of matter and the present invention relates to homogeneous mixtures containing two or three synthetic resins. Said composition of matter, according to the invention, may be dissolved in solvents to form an all-purpose protective coating or may be used as a plastic for the production of molded articles.

Synthetic resins have been used individually as protective coatings and plastics, but when so used have been lacking in heat resistance, have had low chemical and atmospheric corrosion resistance, have been brittle and/or are subject to checking. When used as or in protective coatings, said individual synthetic resins have poor adhesion and are difficult to apply, such as being subject to cobwebbing during spraying.

The primary object of the present invention is the provision of a composition of matter which is remarkably tough and corrosion-resistant, and which produces a protective film or coating of exceptional adhesion and freedom from checking. Other objects of the invention will be apparent to those skilled in the art from the following disclosure.

Our improved composition of matter comprises a mixture or combination of two or more of the following resins: a reaction product of a polybasic or alpha-beta-dicarboxylic acid anhydride and terpinene; a hydrocarbon or cyclo-olefin resin; and a styrol resin.

The reaction product of a polybasic or of an alpha-beta-dicarboxylic acid anhydride and terpinene to be employed in the composition according to the invention may be prepared as follows.

Alpha-terpinene may be obtained by the fractionation of pine oil using the fraction boiling within about the range of (178–182°) C., and about 480 grams of such alpha-terpinene may be heated with about 294 grams of maleic anhydride, or alternatively with an equivalent quantity of maleic acid, at a temperature to cause gentle boiling, say about 150°–200° C. for a period of about five hours. If necessary or desirable, said reaction product may be further purified or refined by distillation under a diminished pressure by which procedure terpinene and impurities will be rendered volatile and so removed from the final reaction product in the still. The preferred reaction product is technically known as 3-isopropyl - 6 - methyl - 3,6 - indoethylene-$\Delta^4$-tetrahydro phthalic anhydride.

In order further to enhance particular qualities, such as the gloss, flexibility or adhesion, of the final composition of matter, said reaction product of a polybasic acid anhydride and terpinene may, if desired, be modified in anyone of several known ways. For instance, said reaction product may be modified by blending with a drying oil, with another synthetic resin, or with a natural resin such as rosin. Such methods of modification may or may not involve the use of heat, or may include the use of a common solvent and the modifying agent may be introduced before or after the reaction is completed, or may constitute the solvent in which the reaction occurs. Preferably and especially for compounding an all-purpose protective coating, said reaction product of a polybasic acid anhydride and terpinene is modified by heating said reaction product together with natural rosin.

The hydrocarbon or cyclo-olefin resins to be used are preferably of the coumarone-indene type and may be obtained by the catalytic polymerization of resin-forming bodies contained in crude solvent naphtha, and other hydrocarbon liquids, containing bodies polymerizable to form resins of the coumarone-indene type.

Specifically, two commercial forms of hydrocarbon resins have been used satisfactorily in the composition of the invention. One a synthetic hydrocarbon resin essentially consisting of dicyclopentadiene polymer and a few per cent of coumarone-indene polymer. The other a synthetic hydrocarbon resin including coumarone-indene with other polymerizable hydrocarbons which is recognized as a hydrogenated coumarone-indene hydrocarbon resin resulting from the catalytic polymerization and hydrogenation of the resin-forming bodies contained in crude aromatic naphtha, as described in U. S. Patent No. 2,319,959 of Tierney (see particularly page 2, column 2, lines 1–27 page 1, column 2, lines 35–53).

The styrol resin may be made by polymerization of styrene to polystyrene and which polymerization may be accomplished by any of the well known methods or by simply heating the liquid styrene to a temperature approximately between 200° and 300° C. and holding the material at that temperature until complete polymerization takes place.

A composition of matter having exceptional hardness, good flexibility, and chemical and weather corrosion resistance comprises a physical mixture of 10-30 parts of the reaction product of a polybasic acid anhydride and terpinene, 20-40 parts of a hydrocarbon resin, and 70-50 parts of a polystyrol resin. By eliminating the hydrocarbon resin and compounding 20-80 parts of a reaction product of a polybasic anhydride and terpinene with 80-20 parts of polystyrene, a composition of matter is obtained which has good hardness and adhesion and which has particularly good weather resistance.

The hydrocarbon resin may be either the coumarone-indene resin or may be the hydrocarbon resin composed primarily of dicyclopentadiene but the dicyclopentadiene resin is preferred because of better adhesion and particularly for compositions which are to be subjected to ultraviolet light.

The following example will further illustrate the nature of this invention, which, however, is not restricted thereto, and will further indicate the particularly characteristics and advantageous properties of the combination of the aforementioned synthetic resins.

*Example*

The composition of matter according to the invention and comprising a reaction product of alpha-beta-dicarboxylic acid anhydride and alpha-terpinene, a hydrocarbon resin, and a styrol resin is preferably prepared by physically mixing 20 parts of the reaction product of maleic acid anhydride and alpha-terpinene, 30 parts of cyclo-olefin resin and 60 parts of polystyrene. To form a lacquer, the mixture is dissolved in a suitable quantity of a solvent, such a solvent may comprise 50% toluene, 25% xylene, 12½% amyl acetate, and 12½% coal tar solvent naphtha. Films formed of such lacquer are exceptionally hard, and have great resistance to corrosion. However, such corrosion resistance is markedly increased when the cyclo-olefin resin is in the form of dicyclopentadiene. Films formed from this modified mixture have been found to resist the action of strong oxidizing reagent, notably silver nitrate solution.

If a protective coating or plastic of equivalent weather resistance and good heat resistance is desired, the hydrocarbon resin may be omitted and a composition of matter is prepared preferably by mixing equal parts of the reaction product of a polybasic acid anhydride and terpinene and of polystyrene.

Although the solvent mixture herein disclosed has been very successfully employed, it is to be understood that the ingredients and proportions of the mixture may be varied considerably within the ranges given, and for instance if slow drying films or slow drying adhesives are required the solvent mixture may be modified by the addition or substitution of comparatively high boiling solvents which are compatible with the other ingredients used. On the other hand, as is known, quick drying films or adhesives are obtained by the addition or substitution of comparatively low boiling solvents to the solvent mixture.

Having now particularly described our invention, what we desire to secure by Letters Patent of the United States and we claim is:

As a composition of matter a homogeneous mass essentially consisting of 10-30 parts of a reaction product of terpinene and maleic anhydride, 20-40 parts of a hydrogenated coumarone-indene hydrocarbon resin resulting from the catalytic polymerization and hydrogenation of the resin-forming bodies contained in crude aromatic naphtha, and 70-50 parts of a polystyrene resin.

IRVING C. MATTHEWS.
WILLIAM F. LYNCH.

REFERENCES CITED

The following references are of record in the file of this patent:

UNITED STATES PATENTS

| Number | Name | Date |
| --- | --- | --- |
| 2,174,885 | Kallander | Oct. 3, 1939 |
| 2,294,651 | Billing | Sept. 1, 1942 |
| 2,319,959 | Tierney | May 25, 1943 |

OTHER REFERENCES

Pages 1150-1152, Ind. and Eng. Chem., Oct. 1936.

Pages 423 and 424, Mattiello, vol. I, "Protective and Decorative Coatings," pub. 1941 by John Wiley and Sons, N. Y.